US007440964B2

(12) United States Patent
Gosse et al.

(10) Patent No.: US 7,440,964 B2
(45) Date of Patent: Oct. 21, 2008

(54) METHOD, DEVICE AND SOFTWARE FOR QUERYING AND PRESENTING SEARCH RESULTS

(75) Inventors: David B. Gosse, Las Vegas, NV (US); Tym D. Feindel, Las Vegas, NV (US)

(73) Assignee: Vortaloptics, Inc., Las Vegas, NV (US)

( * ) Notice: Subject to any disclaimer, the term of this patent is extended or adjusted under 35 U.S.C. 154(b) by 170 days.

(21) Appl. No.: 10/650,684

(22) Filed: Aug. 29, 2003

(65) Prior Publication Data

US 2005/0050014 A1  Mar. 3, 2005

(51) Int. Cl.
*G06F 7/00* (2006.01)
(52) U.S. Cl. .................... 707/102; 707/2; 707/3
(58) Field of Classification Search ............ 707/2–5, 707/102
See application file for complete search history.

(56) References Cited

U.S. PATENT DOCUMENTS

| | | | |
|---|---|---|---|
| 5,551,027 A | 8/1996 | Choy et al. | |
| 5,710,915 A | 1/1998 | McElhiney | |
| 5,826,261 A | 10/1998 | Spencer | |
| 5,913,208 A | 6/1999 | Brown et al. | |
| 5,966,710 A | 10/1999 | Burrows | |
| 6,018,733 A | 1/2000 | Kirsch et al. | |
| 6,094,649 A | 7/2000 | Bowen et al. | |
| 6,178,419 B1 * | 1/2001 | Legh-Smith et al. | 707/6 |
| 6,269,361 B1 | 7/2001 | Davis et al. | |
| 6,327,590 B1 | 12/2001 | Chidlovskii et al. | |
| 6,347,317 B1 | 2/2002 | Singhal | |
| 6,636,854 B2 | 10/2003 | Dutta et al. | |
| 6,728,704 B2 * | 4/2004 | Mao et al. | 707/3 |
| 6,832,224 B2 * | 12/2004 | Gilmour | 707/100 |
| 6,834,276 B1 * | 12/2004 | Jensen et al. | 707/2 |
| 6,876,997 B1 | 4/2005 | Rorex et al. | |
| 6,947,924 B2 | 9/2005 | Bates et al. | |
| 2001/0042064 A1 | 11/2001 | Davis et al. | |
| 2002/0194162 A1 | 12/2002 | Rios et al. | |
| 2003/0018624 A1 | 1/2003 | Hsiao et al. | |

(Continued)

FOREIGN PATENT DOCUMENTS

CN  1378674  11/2002

OTHER PUBLICATIONS

W. Meng, C. Yu, King-Lupo Liu: "Building Efficient and Effective Metasearch Engines". AMC Computer Surveys, 'Online! vol. 34, No. 1, Mar. 2002, pp. 48-49.

(Continued)

*Primary Examiner*—John Cottingham
*Assistant Examiner*—Robert Timblin

(57) ABSTRACT

A method, device, and software for presenting search results obtained from a plurality of databases, based on an end-user specified query, is disclosed. In an embodiment, the search results are combined from results from a first index and results from a second index. The first index comprises a plurality of index entries modifiable by an administrator, and the second index comprises a plurality of index entries that are not modifiable by the administrator. In the combined search results, any search result from the second index for which an associated key field is identical to the associated key field of a matching search result in the first set of search results is discarded in favor of the matching search result in the first set of search results.

27 Claims, 8 Drawing Sheets

U.S. PATENT DOCUMENTS

| | | |
|---|---|---|
| 2003/0041054 A1 | 2/2003 | Mao et al. |
| 2003/0101413 A1 | 5/2003 | Klein et al. |
| 2003/0191737 A1* | 10/2003 | Steele et al. .................... 707/1 |
| 2004/0010518 A1 | 1/2004 | Montemer |
| 2004/0111412 A1 | 6/2004 | Broder |
| 2004/0260679 A1* | 12/2004 | Best et al. ...................... 707/3 |
| 2004/0260680 A1 | 12/2004 | Best et al. |
| 2004/0260695 A1 | 12/2004 | Brill |

OTHER PUBLICATIONS

Examination Report for related Chinese Patent Application No. 200480029767.1, filed Apr. 28, 2006.

* cited by examiner

METHOD, DEVICE AND SOFTWARE FOR QUERYING AND PRESENTING SEARCH RESULTS

FIELD OF THE INVENTION

The present invention relates to search engines and indexes, and more particularly to a method, device and software for querying and presenting search results obtained from a plurality of indexes.

BACKGROUND OF THE INVENTION

The rapid growth of the Internet and the World Wide Web ("web") has resulted in a proliferation of web search engines for indexing some of the billions of web pages available. As is well known, the web is a hypertext information and communication system which operates according to a client-server model, known as Hyper Text Transfer Protocol ("HTTP"). HTTP allows users to access these web pages using a standard page description language known as Hyper Text Markup Language ("HTML"). HTML may be used to access files provided in many different formats. Typically, these web pages are accessible using an addressing allowing scheme allowing pages on the web to be accessed by a Uniform Resource Locator ("URL").

By specifying a URL, an end-user is able to access virtually any accessible web page from a web server connected to the web. However, without knowledge of a URL, an end-user must typically rely on a web search engine that can search a web index or directory to locate URLs for relevant web sites.

While certain search engines ambitiously attempt to broadly index significant portions of the entire web, other search engines focus on a more specific target and are designed, for example, to exhaustively index a particular web site of an institution. Such a search of a specific target is commonly referred to as a "vertical" search. As a single web site may include hundreds or thousands of web pages, such a "vertical" search engine may be very useful.

Typically, a search engine indexes web pages by keywords. URLs are indexed against keywords contained in the associated web page. End-user can thus search web pages using the keywords. If there are one or more index entries that match the keyword(s), records corresponding to those index entries may be retrieved, and relevant fields of those records may be displayed to the end-user as matching results.

From an end-user's perspective, when visiting the web site of an institution, it is often desirable to have a flexible and robust keyword query capability. However, if a search engine is being used to search a web index for a relatively small web site, the likelihood of receiving a match may be low. Correspondingly, end-user satisfaction with the web site may be negatively affected.

In order to provide the end-user with a better chance of obtaining relevant search results, an institution may sometimes offer end-users the capability to search a public index as well. However, in offering access to a public index, the institution may be taking a risk that some of the search results may not be appropriate for presentation. As a specific example, consider a query made by the end-user that results in a match for a website operated by a main competitor of the institution. The institution may wish to avoid presenting such search results to the end-user.

However, previous efforts to query and selectively present search results from private and public indexes have been hampered by the lack of effective control over the public indexes.

A more flexible and effective approach is desirable.

SUMMARY OF THE INVENTION

In accordance with the invention, there is provided a method, device, and software for presenting search results obtained from a plurality of indexes, based on an end-user specified query. In an embodiment, the search results are combined from results from a first index and results from a second index. The first index comprises a plurality of index entries modifiable by an administrator, and the second index comprises a plurality of index entries that are not modifiable by the administrator. In the combined search results, any search result from the second index for which an associated key field is identical to the associated key field of a matching search result in the first set of search results is discarded in favor of the matching search result in the first set of search results.

In an aspect of the invention, there is provided a method of presenting search results in a response to an end-user query, the search results being combined from results from a first index and results from a second index, the first index comprising a plurality of index entries modifiable by an administrator, the second index comprising a plurality of index entries that are not modifiable by the administrator, the index entries of the first index and the second index each having an associated key field, the method comprising:

(i) querying index entries of the first index using the query to extract a set of first search results, each including a value of the associated key field, each of the first search result associated with a quality of match;

(ii) querying index entries of the second index using the query to extract a set of second search results, each including a value of the associated key field, each of the second search result associated with a quality of match;

(iii) combining the first and second set of search results to generate a list of matching search results, in which any search result from the second index for which an associated key field is identical to the associated key field of a matching search result in the first set of search results is discarded, in favor of the matching search result in the first set of search results.

In an embodiment. each of the index entries comprises at least one keyword, and the querying index entries of the first index comprises matching keywords in a query to the at least one keyword for each of the index entries in the first index.

In an embodiment, each of the at least one keyword is associated with a weight, and the quality of match is calculated by summing weights for each of the one keyword that matches a keyword in the query.

In an embodiment, the associated key field of each the search result obtained from the first index identifies a uniform resource locator (URL), and the associated key field of each the search result obtained from the second index identifies a URL.

In an embodiment, each of the index entries comprises at least one keyword, and the querying index entries of the first index comprises matching keywords in a query to the at least one keyword for each of the index entries in the first index.

In an embodiment, each of the at least one keyword is associated with a weight, and the quality of match is calculated by summing weights for each of the one keyword that matches a keyword in the query.

In an embodiment, the combining in (iii) comprises utilizing the quality of match to present an ordered listing of URLs identified in each of the search results in the list of matching search results.

In an embodiment, the method further comprises excluding search results having a predetermined quality of match from being presented as part of the ordered listing.

In an embodiment, the predetermined quality of match is a null value.

In a second aspect of the invention, there is provided a computing device comprising a processor and computer readable memory, the memory storing
- a first index and a second index, the first index comprising a plurality of index entries modifiable by an administrator, the second index comprising a plurality of index entries that are not modifiable by the administrator, the index entries of the first index and the second index each having an associated key field,
- search engine software adapting the device to
  - (i) query index entries of the first index using a query to extract a set of first search results, each including a value of the associated key field, each of the first search result associated with a quality of match;
  - (ii) query index entries of the second index using the query to extract a set of second search results, each including a value of the associated key field, each of the second search result associated with a quality.of match;
  - (iii) combine the first and second set of search results to generate a list of matching search results, in which any search result from the second index for which an associated key field is identical to the associated key field of a matching search result in the first set of search results is discarded, in favor of the matching search result in the first set of search results.

In an embodiment, each of the index entries comprises at least one keyword, and the search engine software further adapts the device to query index entries of the first index by matching keywords in a query to the at least one keyword for each of the index entries in the first index.

In an embodiment, each of the at least one keyword is associated with a weight, and the search engine software further adapts the computing device to calculate the quality of match by summing weights for each of the one keyword that matches a keyword in the query.

In an embodiment, the associated key field of each the search result obtained from the first index identifies a uniform resource locator (URL), and the associated key field of each the search result obtained from the second index identifies a URL.

In an embodiment, the index entries comprises at least one keyword, and the search engine software further adapts the device to query index entries of the first index to match keywords in a query to the at least one keyword for each of the index entries in the first index.

In an embodiment, each of the at least one keyword is associated with a weight, and the search engine software adapts the computing device to calculate the quality of match by summing weights for each of the one keyword that matches a keyword in the query.

In an embodiment, the search engine software further adapts the computing device to combine the first and second set of search results from the each of the qualities of match to present an ordered listing of URLs identified in each of the search results in the list of matching search results.

In an embodiment, the search engine software further adapts the computing device to exclude search results having a predetermined quality of match from being presented as part of the ordered listing.

In an embodiment, the predetermined quality of match is a null value.

In another aspect of the invention, there is provided a computer readable medium, storing computer executable instructions that when loaded at a computing device comprising a processor and processor readable memory storing a first index and a second index, the first index comprising a plurality of index entries modifiable by an administrator, the second index comprising a plurality of index entries that are not modifiable by the administrator, the index entries of the first index and the second index each having an associated key field, adapt the computing device to:
- (i) query index entries of the first index using a query to extract a set of first search results, each including a value of the associated key field, each of the first search result associated with a quality of match;
- (ii) query index entries of the second index using the query to extract a set of second search results, each including a value of the associated key field, each of the second search result associated with a quality of match;
- (iii) combine the first and second set of search results to generate a list of matching search results, in which any search result from the second index for which an associated key field is identical to the associated key field of a matching search result in the first set of search results is discarded, in favor of the matching search result in the first set of search results.

In an embodiment, each of the index entries comprises at least one keyword, and the computer executable instructions further adapt the computing device to query index entries of the first index to match keywords in a query to the at least one keyword for each of the index entries in the first index.

In an embodiment, each of the at least one keyword is associated with a weight, and the computer executable instructions further adapt the computing device to calculate the quality of match by summing weights for each of the one keyword that matches a keyword in the query.

In an embodiment, the associated key field of each the search result obtained from the first index identifies a uniform resource locator (URL), and the associated key field of each the search result obtained from the second index identifies a URL.

In an embodiment, each of the index entries comprises at least one keyword, and the computer executable instructions further adapt the computing device to query index entries of the first index comprises code for matching keywords in a query to the at least one keyword for each of the index entries in the first index.

In an embodiment, each of the at least one keyword is associated with a weight, and the computer executable instructions further adapt the computing device to calculate the quality of match by summing weights for each of the one keyword that matches a keyword in the query.

In an embodiment, the computer executable instructions further adapt the computing device to utilize the quality of match to present an ordered listing of URLs identified in each of the search results in the list of matching search results.

In an embodiment, the computer executable instructions further adapt the computing device to exclude search results having a predetermined quality of match from presentation to the end-user.

In an embodiment, the predetermined quality of match is a null value.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate exemplary embodiments of the invention.

DETAILED DESCRIPTION

Figure 1A:
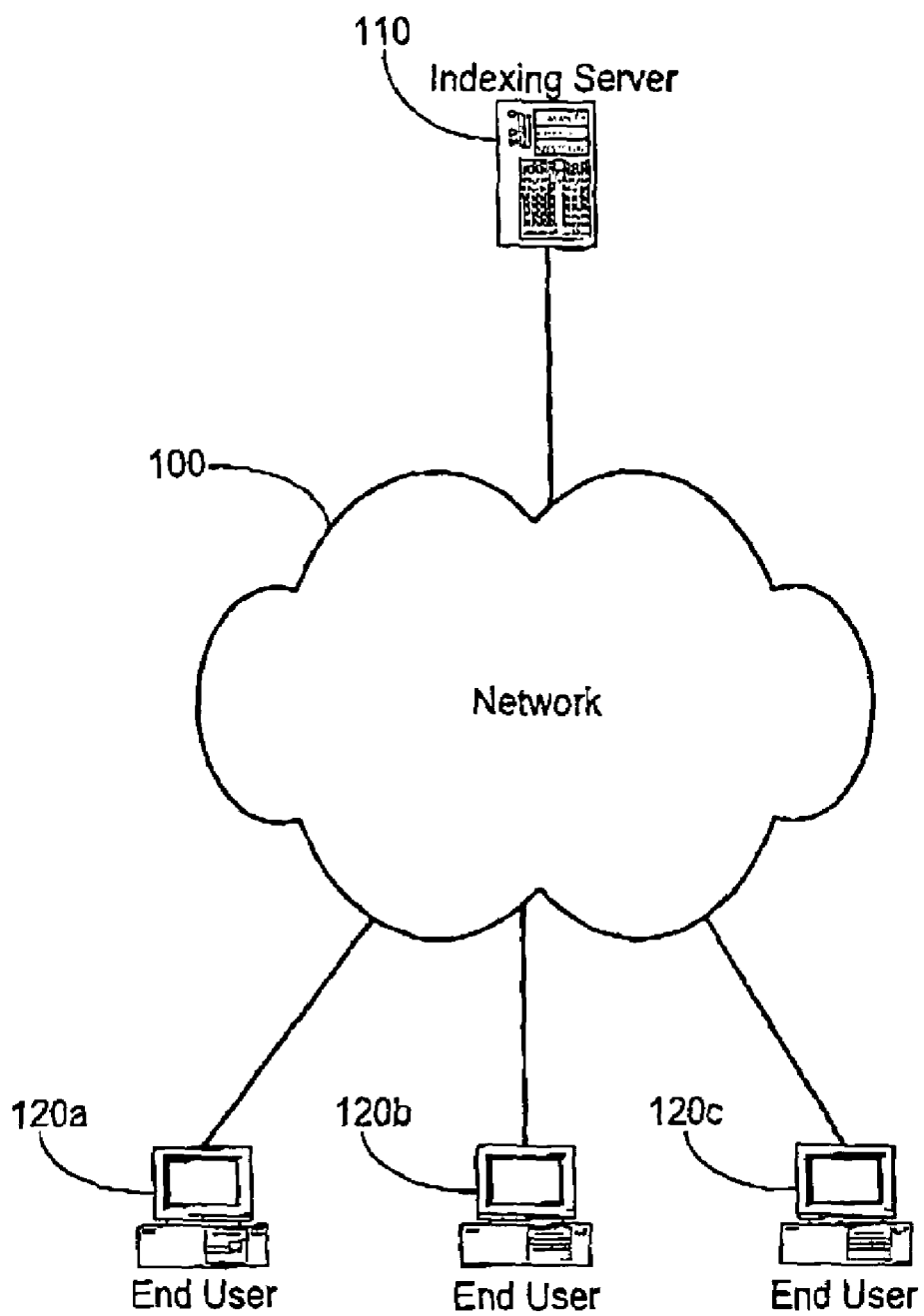
FIG. 1A is a simplified schematic diagram of an exemplary data communications network interconnected with an indexing server exemplary of an embodiment of the present invention, in communication with a plurality of computing devices.

FIG. 1A illustrates an exemplary data communications network 100, interconnected with an indexing server 110 exemplary of an embodiment of the present invention, in communication with a plurality of computing devices 120a, 120b and 120c (individually and collectively devices 120).

Computing devices 120 and indexing server 110 are all conventional computing devices, each including a processor and computer readable memory storing an operating system and software applications and components for execution.

Data communications network 100 may, for example, be a conventional local area network that adheres to suitable network protocol such as the Ethernet, token ring or similar protocols. Alternatively, the network protocol may be compliant with higher level protocols such as the Internet protocol (IP), Appletalk, or IPX protocols. Similarly, network 100 may be a wide area network, or the public internet, Client computing devices 120 are network aware computing devices, providing an end-user interface that allows an end-user to view information stored at indexing server 110. Computing devices 120 may for example, be conventional Windows based computing devices storing and executing an HTML compliant browser, such as a Microsoft Windows Explorer, Netscape Navigator or similar browser.

As will become apparent, indexing server 110 stores web indexing information, and may store software allowing devices 120 to search the stored indexing information.

Figure 1B:
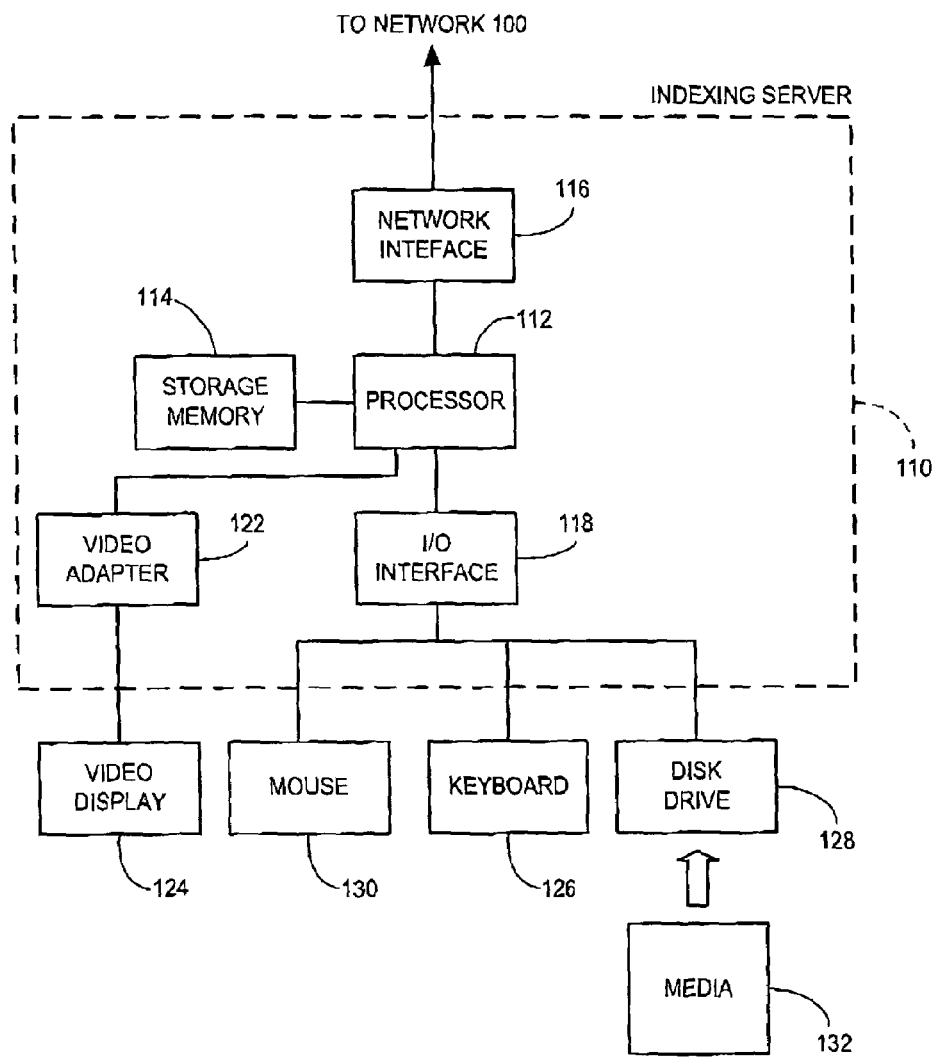
FIG. 1B is a simplified schematic block diagram of a hardware architecture of the indexing server of FIG. 1A.

A simplified preferred hardware architecture of an example indexing server 110 is schematically illustrated in FIG. 1B. In the illustrated embodiment, indexing server 110 is a conventional network capable server. Indexing server 110 could, for example, be an Intel x86 based computer acting as a Microsoft Windows NT, Apple, or Unix based server, workstation, personal computer or the like. Example indexing server 110 includes a processor 112, in communication with computer storage memory 114; network interface 116; input output-interface 118; and video adapter 122. As well, indexing server 110 may optionally include a display 124 interconnected with adapter 122; input/output devices, such as a keyboard 126, disk drive 128, and a mouse 130 or the like. Processor 112 is typically a conventional central processing unit, and may for example be a microprocessor in the INTEL x86 family. Of course, processor 112 could be any other suitable processor known to those skilled in the art. Computer storage memory 114 includes a suitable combination of random access memory, read-only-memory, and disk storage memory used by processor 112 to store and execute software programs adapting processor 112 to function in manners exemplary of the present invention. Disk drive 128 is capable of reading and writing data to or from a computer readable medium 132 used to store software and data, exemplary of embodiments of the present invention, to be loaded into memory 114. Computer readable medium 132 may be a CD-ROM, diskette, tape, ROM-Cartridge or the like. Network interface 126 is any interface suitable to physically link server 110 to network 100. Interface 126 may, for example, be an Ethernet, ATM, ISDN interface or modem that may be used to pass data from and to network 100 or another suitable communications network.

The hardware architectures of computing devices 120 are materially similar to that of indexing server 110, and will therefore not be further detailed.

Figure 2A:
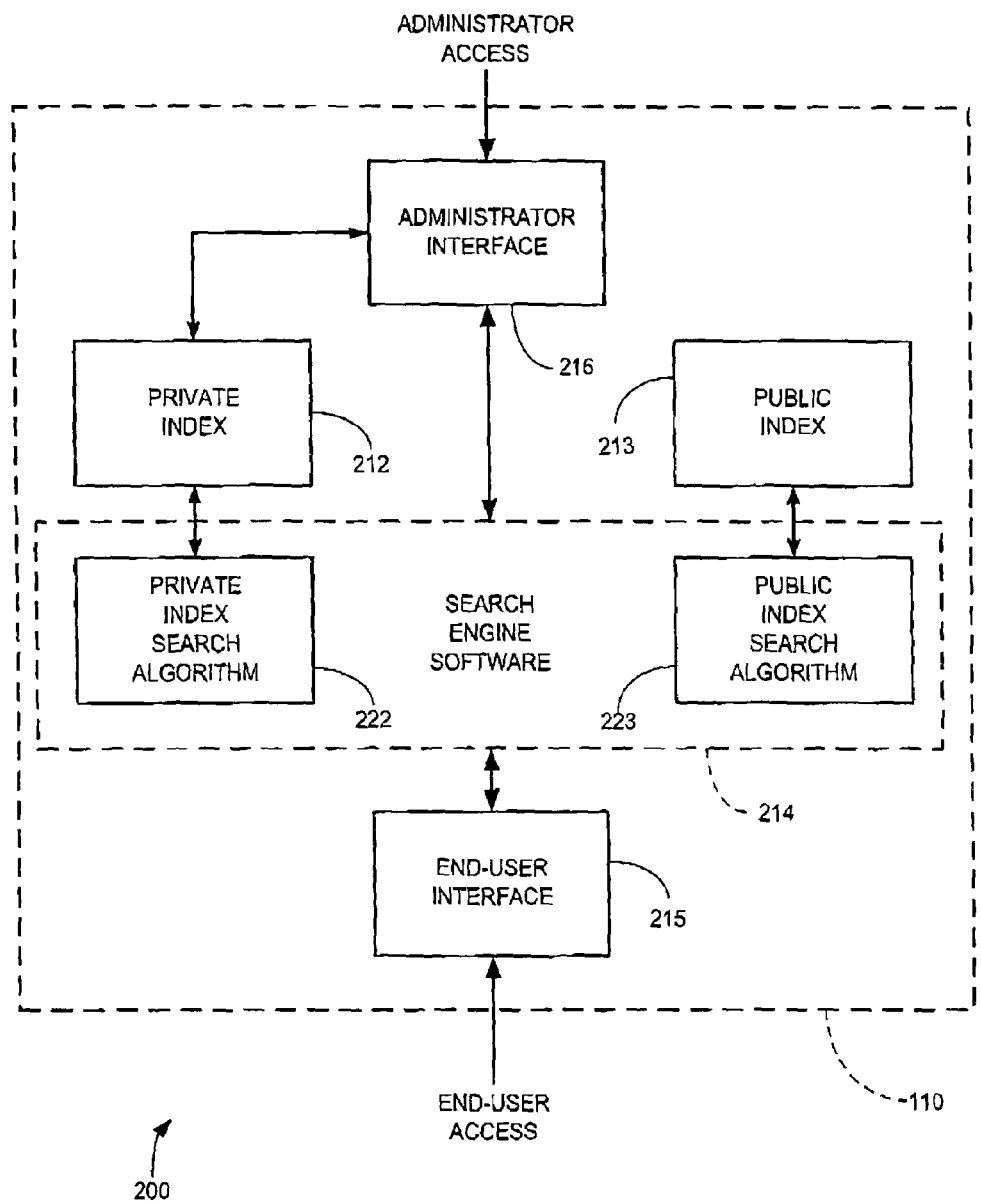
FIG. 2A is a logical block diagram of software and data components at the indexing server of FIGS. 1A and 1B.

FIG. 2A is a logical block diagram of software and data components at server 110. As illustrated, indexing server 110 hosts two indexes, including a private index 212 and a public index 213, as well as search engine software 214, end-user interface 215, and an administrator interface 216.

As will become apparent, an end-user at devices 120 may access search engine software 214 through network 100, to communicate with end-user interface 215. End-user interface 215 may, for example, accept search requests provided as "name =value" pairs embedded within an HTTP GET/POST request. Administrators, acting on behalf of a particular institution may modify private index 212, by way of administrator interface 216, as detailed below. (As will be appreciated, the search engine software 214 may itself be embodied as one or more software modules stored in memory and executable on a processor in the indexing server 110.)

Index 212 contains index entries to be searched by end-users. An administrator of a particular institution may modify only records of index 212 associated with that institution. End-users, in turn, are provided with index entries corresponding to one institution. Typically, end-users are provided with only access based on the web address used for end-user interface 215. Ideally, access to index 212 is provided by an institution through that institution's web site. End-users are classified as being associated with the institution whose web site they have accessed, and are only provided data from index entries controlled by that institution.

Search engine software 214 accesses two search algorithms 222 and 223, one associated with each index 212, 213, which may define how a search is to be performed on the associated index 212, 213. These search algorithms 222, 223 may be "modular" in the sense that the search algorithms 222, 223 may be modified or replaced individually.

Figures 2B, 2C, 2D:
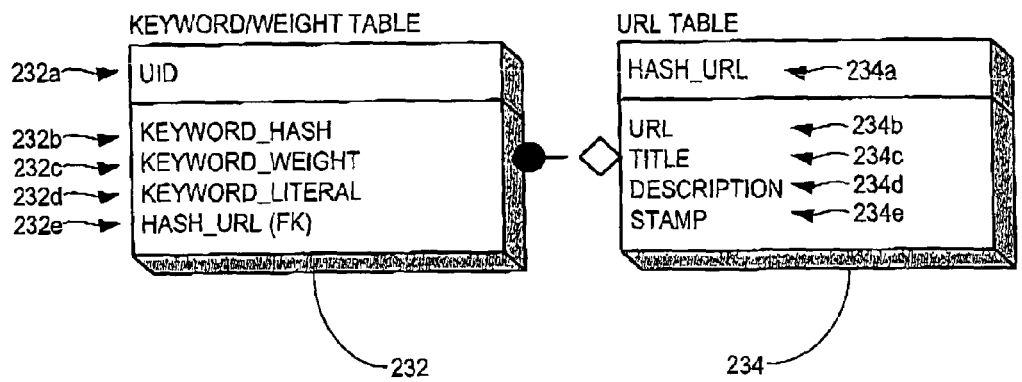
FIG. 2B is a schematic block diagram of an exemplary database schema for an index illustrated in FIG. 2A.
FIG. 2C is an illustrative example of a keyword/weight database table corresponding to the database schema of FIG. 2B.
FIG. 2D is an illustrative example of a URL database table corresponding to the database schema of FIG. 2B.

In the disclosed embodiments, indexes 212 and 213 are stored as one or more relational databases. FIG. 2B is a schematic block diagram of an exemplary database schema 230 for private index 212 of FIG. 2A. As noted, index 212 indexes web pages to be searched. The web pages are indexed by their URL and associated key words that an end-user may use to locate the URL (and thus the web page). In the disclosed embodiment, each web page URL in the private index 212 is associated with at least one keyword, and each associated keyword is assigned a weighting. Multiple records of table 240 define the multiple key words (KEYWORD_HASH) and weights (KEYWORD_WEIGHT) associated with a single URL (HASH_URL). The UID in the KEYWORD/WEIGHT TABLE (232) is a physical primary key which serves to uniquely identify each record.

As shown by schema 230, database storing index 212 may include a keyword/weight table 232 and a corresponding URL table 234. In an embodiment, the schema requires each institution to have its own pair of tables 232, 234. For example, an institution with a client code 'CF' would have tables 'CF_KEYWORD_WEIGHT_TABLE' and 'CF_URL_TABLE'.

FIG. 2C illustrates a keyword/weight database. table 240 corresponding to schema 230 (FIG. 2B). More specifically, table 240 includes a plurality of records 240*a*-240*c*, each containing a plurality of fields 232*a*-232*e* for a particular institution. Using arbitrarily chosen values for illustration, records 240*a*-240*c* contain, respectively: keyword hash values "72", "73", "74"; weightings 100, 70, 90; literal keywords "KW1", "KW2", "KW3"; and hash URL values "12", "12", "12". Thus, in this particular example, an index entry for a URL having a hash value "12" includes three keywords "KW1", "KW2", "KW3" having relative weightings of 100, 70 and 90.

FIG. 2D is an illustrative example of a database table 250 of index 212 corresponding to URL table 234 of FIG. 2B. More specifically, database table 250 includes a plurality of records 250*a*-250*c* each having a plurality of fields 234*a*-234*e*. Each record of table 250 provides detailed information about an indexed URL. Using arbitrarily chosen values for illustration, the records 250*a*-250*c* of database 250 contain, respectively: hash URLs "12", "13", "14"; corresponding URL addresses www.1.com, www.2.com, www.3.com; titles "One", "Two", "Three"; descriptions "Home page for One", "Home page for Two", "Home page for Three"; and corresponding date/time stamps.

Figure 3A:
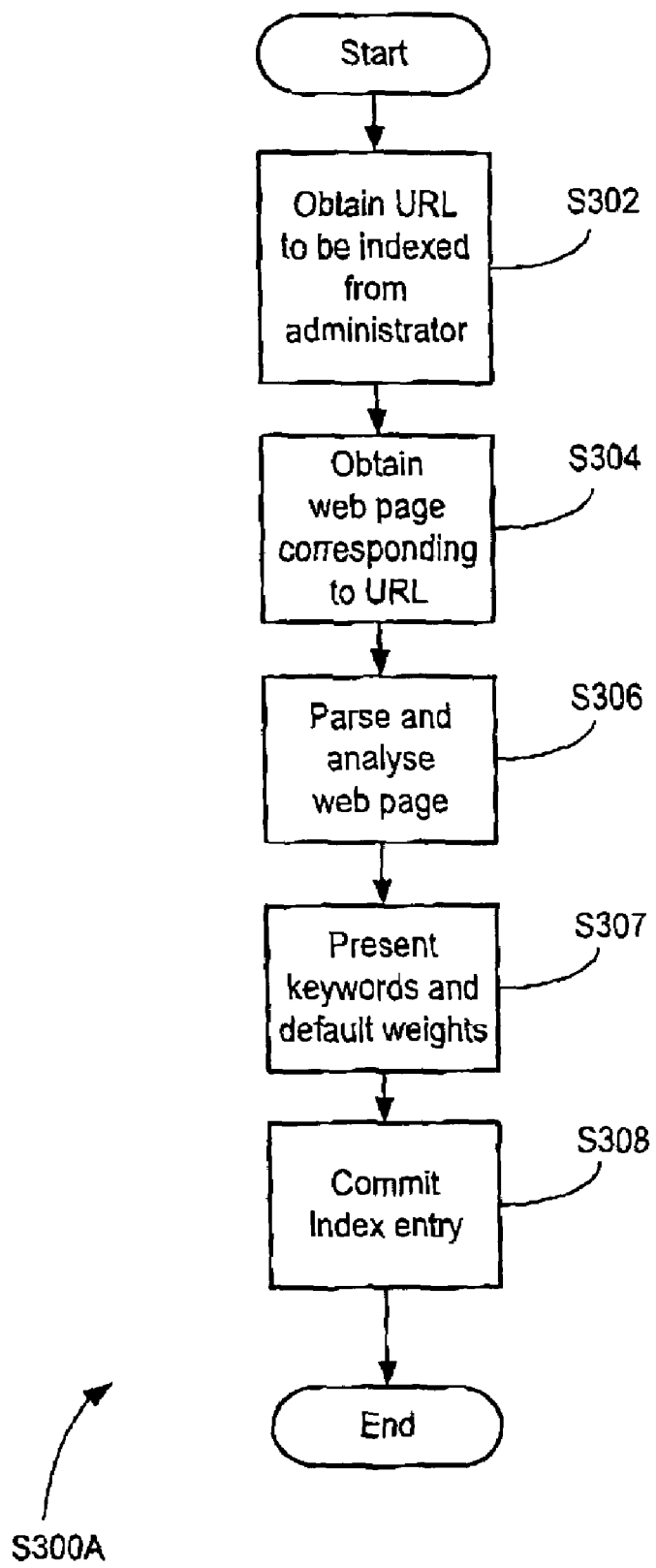
FIG. 3A is a schematic flow chart of exemplary steps for associating keywords and assigning weightings to URLs in order to create records in the databases of FIGS. 2C and 2D.

FIG. 3A is a flow chart showing exemplary steps S300A for associating keywords and assigning weightings to URLs in order to create records in table 240 and 250 of private index 212 (FIG. 2A). Steps 300A may be performed by server 200 under control of software exemplary of embodiments of the present invention. As illustrated, a URL of a web page to be indexed is obtained from an administrator in step S302. In step S304 the web page is obtained. In step S306, the contents of the web page are parsed and analyzed in order to identify possible keywords that might be used to index the page. For example, keywords may be identified by their frequency in the web page, in meta-tags or in any other way understood by those of ordinary skill. In an embodiment, up to 20 of the most relevant keywords (as identified in step S306) are each assigned a numerical weight, corresponding to their perceived relevance. The list of keywords and weights is presented by way of an administrator interface (e.g. administrator interface 216 of FIG. 2A) to an administrator in step S307. Optionally, the administrator may alter the presented keywords and/or weightings by way of the administrator interface 216, for reasons that will become apparent. Once edited, an administrator may commit the index entry, including the list of keywords and URL, for storage as records in table 240 and table 250 of index 212, in step S308. Each keyword is used to populate one row of table 240.

Repeated use of steps S300A allow an administrator acting for an institution of indexing server 110 to build a collection of indexed sites, each containing an index entry within private index 212. As will become apparent, by assigning desired keywords and weighting to indexed URLs. the administrator can effectively shape obtained search results for any search performed by search algorithm 222.

By contrast, public index 213 containers index information not assembled by an administrator of an institution, and may instead be made available by a third party index provider. For example, index 213 may contain index information found in the open directory database DMOZ—Open Directory Project available at the URL "http://www.dmoz.org". Advantageously, the indexing information in public index 213 may be used by multiple institutions on indexing server 110. In the disclosed embodiment, index 213 is stored in a database having much the same format as the database storing index 212.

Index 213 may alternatively have a data structure entirely different from index 212. As index 213 is shared by multiple institutions on indexing server 110, an administrator of index 212 for a particular institution typically has no ability to alter entries of index 213.

In manners exemplary of embodiments of the present invention, an administrator for an institution may index a web site already indexed within public index 213, in private index 212. As will become apparent, indexing a site already indexed in public index 213 in private index 212 allows the administrator to control how, if at all, a site indexed in public index 213 is presented to end-users.

Figure 3B:
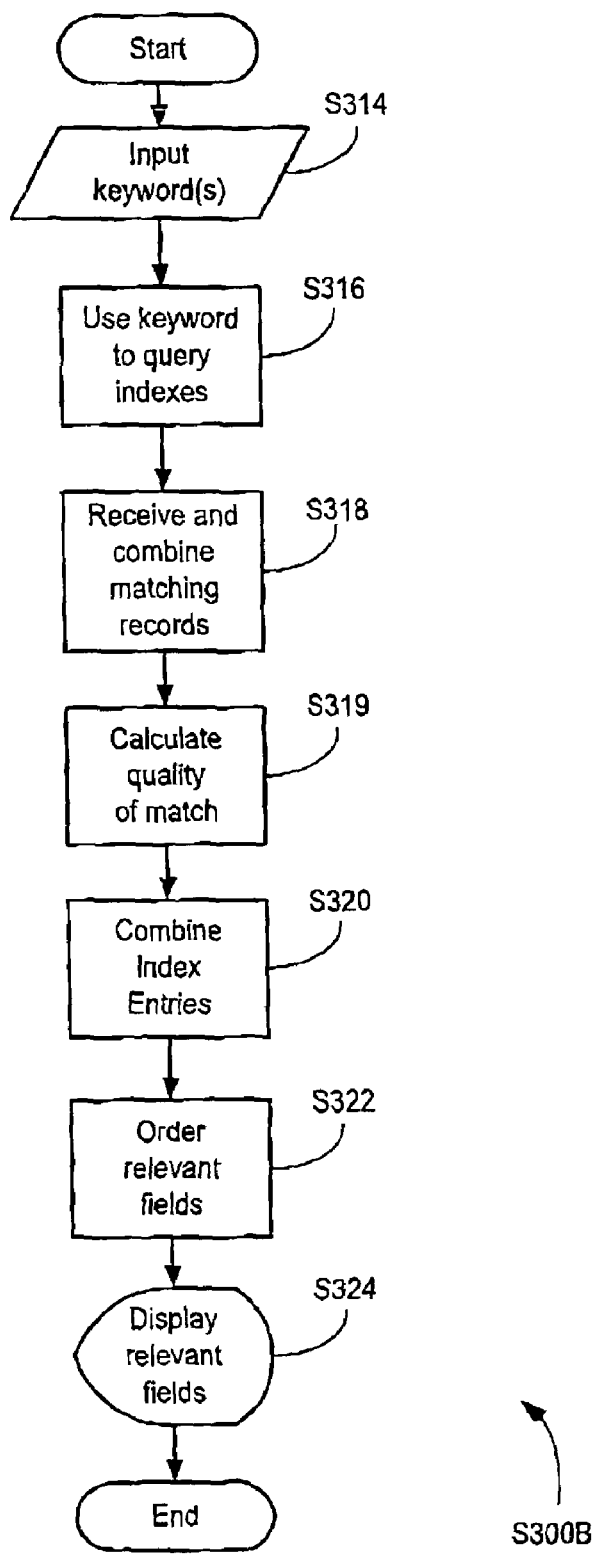
FIG. 3B is a schematic flow chart of exemplary steps performed by the indexing server to query indexes in response to a query request.

FIG. 3B shows exemplary steps S300B performed by indexing server 110 to query both private index 212 and public index 213, in response to a query request including one or more keywords input by an end-user. Again, it will be appreciated by those skilled in the art that steps S300B may be embodied in computer software, exemplary of embodiments of the present invention, including readable code written in a suitable computer language As illustrated, a query request including one or more keywords input at indexing server 110 by an end-user is received in step S314. In step S316 the keyword supplied in step S314 is used to query both private index 212 and the public index 213 to retrieve matching records in indexes 212 and 213. In the disclosed embodiment search algorithm 222 is used to query private index 212, and search algorithm 223 is used to query public index 213. Steps S300B receive and combine the matching records in step S318. For each matching site in public database 212, a quality of match indicator is calculated in step S319. In the preferred embodiment, the quality of match indicator is calculated by summing the weighting (e.g. as contained in field 232*c* of table 240) of each keyword matching the search request. (As will become apparent, in an embodiment, a predetermined value for a quality of match calculated from summing the weight of keywords matching the search request may be used to determine how the corresponding record is dealt with.)

A quality of match indicator may similarly be calculated for matching entries of index 213. Conveniently the two search algorithms 222 and 223 (FIG. 2A) may individually calculate different quality of match indicators for matches of public index 212, and private index 213.

Index entries from the public index 213 and private index 212 may be combined In step S320. The results may be combined in any number of ways. For example, index entries from public and private indexes 212 may be collectively ordered based on the quality of match calculated for each index entry. Index entries with higher quality of matches may be presented in advance of index entries having lower quality of matches. Alternatively, all matching entries from private index 212 may be presented in advance of entries from public index 213.

However, in the event a site is indexed in both private index 212 and public index 213, and index entries for the same site are retrieved from public index 213 and public index 212 in step S318, the index entry from the private index may pre-empt the index entry from public index 213. That is, instead of including both index entries from private index 212 and public index 213, only the index entry from private index 212 is possibly presented.

Relevant fields in the records combined at step S320 are ordered at step S322 and relevant fields are displayed to the end-user at step S324. In an embodiment, the URL field 234b of FIG. 2D may be displayed to the end-user in the order determined at step S324. Additional fields such as the title field 234c, the description field 234d, and the stamp field 234e may also be displayed. Steps S300B then end.

EXAMPLES

Figure 4A:
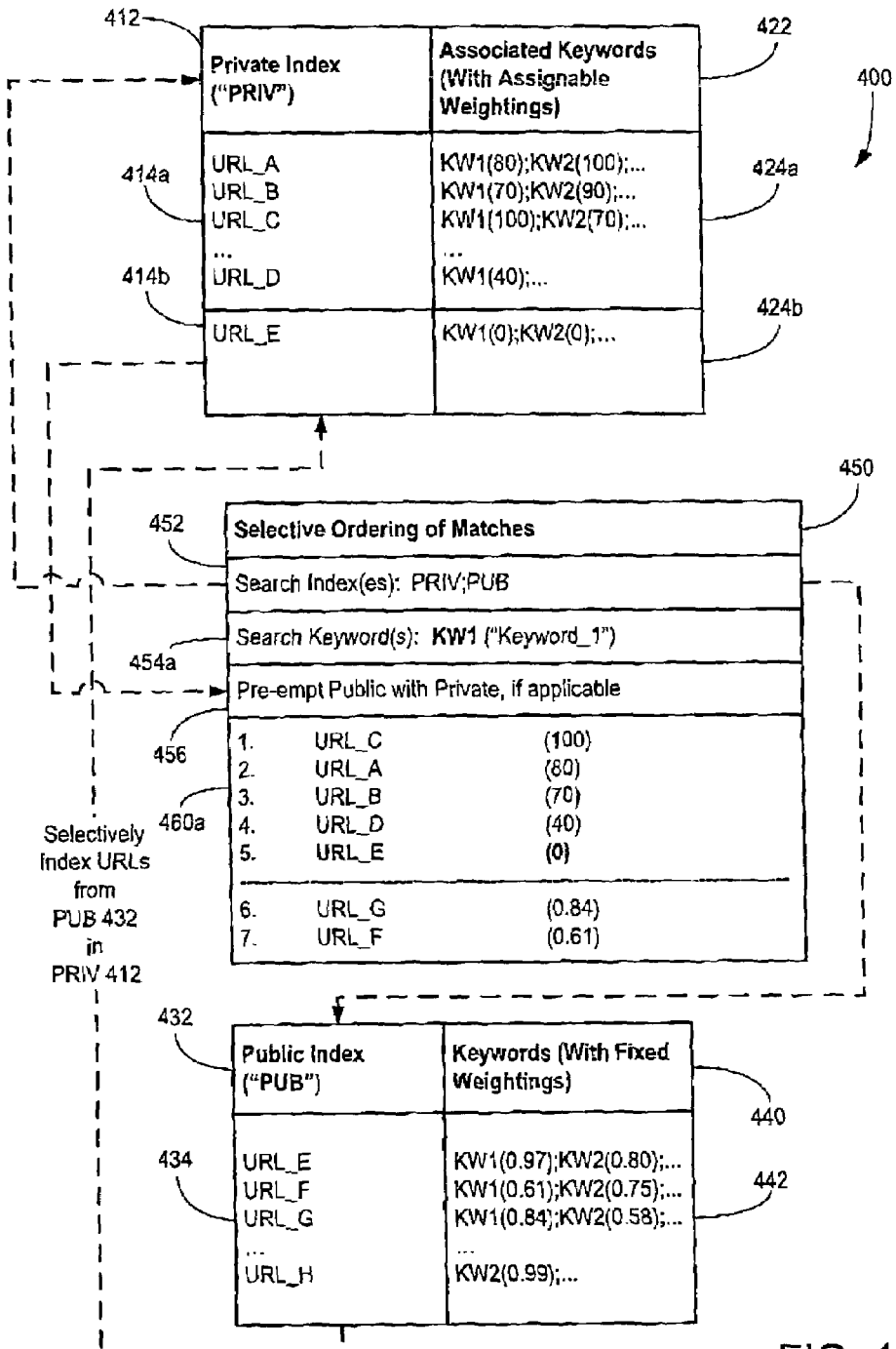
FIG. 4A schematically illustrates search results obtained for an example query.

FIG. 4A schematically illustrates results of an example query performed at server 110. More specifically, example private index 412 (having the structure of private index 212) indexes URL listings in block 414a. Tables 240 and 250 are suitably populated.

In FIG. 4A, arbitrary example URLs in block 414a are labeled "URL_A", "URL_B", "URL_C", and "URL_D". "URL_E" shown at block 414b will be explained in further detail below.

For each URL in block 414a, 414b a list of associated keywords used to index the URL is depicted in block 424a, 424b. Each of the keywords in block 424a are assigned weights shown schematically in parentheses. The URLs in block 414a are controlled, for example, by an administrator for institution "Client 1". Thus, keywords and weightings at 424a may be readily modified by the administrator for institution "Client 1". For example, the administrator may use exemplary method S300A of FIG. 3 to associate the keywords and assign the keyword weightings for the various URLs "$URL_{13}$ A" to "URL_D".

In this illustrative example, a first keyword "KW1" with a weighting of "80" and a second keyword "KW2" with a weighting of "100" are both associated with "URL_A". As another example, the same first keyword "KW1" having a different weighting of "70" and the same second keyword "KW2" having a different weighting of "90" may both be associated with "URL_B". The weighting range of 0-100 is arbitrarily chosen for illustration.

FIG. 4A further schematically illustrates entries in a public index 432, of the form of public index 213, representing a number of indexed URLs in block 434, namely, "$URL_{13}$ E" to "$URL_{13}$ H". For each URL in block 434, there is one or more associated keywords (as shown under heading 440), with weightings shown in parentheses, as shown at block 442.

Example public index 432 is generated by a third party. It may for example be generated automatically by software that follows linked pages in order to generate an index. For each page, the software identifies a list of significant associated keywords. In addition to automatically generating the keywords, a weighting may be assigned to each keyword associated with a given web page. For example, the weighting may be derived from how frequently a given keyword appears in the web page, or whether the keyword appears in a special area of the web page, such as the title or description. The range of fixed weightings 0.00-0.99 shown here is arbitrarily chosen for the purposes of illustration.

In any event, institutional user "Client 1" has initially no effective ability to edit index entries in index 432 (i.e. "URL_E" to "URL_H" in block 434 or any of the keywords weightings shown in block 442).

However, as previously shown and described with reference to FIG. 3A, relative weightings of a given keyword associated (as shown under heading 422) with a given URL in private index 412 may be readily changed by the administrator for institution "Client 1". For example, for "KW1" associated with record "$URL_{13}$ A", the current weighting of "80" may be raised or lowered at will by assigning a new weighting. In this case, the quality of match of "$URL_{13}$ A", when a query includes the keyword "KW1", may be directly controlled such that $URL_{13}$ A results in a higher quality of match for keyword "KW1" and thus appears higher or lower in a list of search results.

Advantageously, for URLs in private index 412, any keyword may be associated with a given URL, even if that keyword is not automatically generated, and even if that keyword does not appear in the subject web page. In other words, a keyword may be arbitrarily assigned to a URL for the purposes of causing that URL to appear or not appear in the search results when that keyword is used in a query. For example, if it is desirable to present "URL_D" whenever a keyword "KW9" (not shown) is entered in a query by an end-user, the keyword "KW9" is simply associated with "URL_D", and a suitable weighting may be assigned to KW9 for "URL_D" in order to ensure that "URL_D" appears whenever the keyword "KW9" is used.

Conveniently, an administrator may shape the order of search results for any keyword simply by adjusting the relative weights of indexed URLs for that keyword.

In order to effectively allow the end-user to include URLs in public index 432 in any shaped search, as shown in FIG. 4A, one or more of the URLs in public index 432 may be selectively indexed by an administrator in private index 412. Specifically, in this illustrative example, "URL_E" has been indexed in private index 412.

As will be apparent, the indexing of "URL_E" in private index 412 allows an administrator to affect presentation of "URL_E" in a search result. In an embodiment, the level of control over "URL_E" becomes the same as that over the other URLs in the block 414a. In other words, keywords may be arbitrarily associated with "URL_E", and weightings may be arbitrarily assigned to those keywords by the administrator of the institution.

In the present example, "URL_E" has been associated with keywords "KW1" and "KW2", with each of "KW1" and "KW2" being assigned a weighting of "0" or a "null" weighting. In an embodiment, such a null weighting may be assigned if, for example, it is undesirable to include that record in combined search result when either of those two keywords "KW1" or "KW2" are entered. For example, "URL_E" may point to the web site of the main competitor of an institution.

To further illustrate this, block 450 depicts search results in response to a search for keyword KW1 combining URLs obtained from both private index 412 and public index 432 (as indicated at block 452). Here, the keyword "KW1" has been entered by an end-user, as indicated at block 454a. As indicated at 456, results for any URLs in public index 432 matching the keyword "KW1" may be pre-empted by corresponding URLs in private index 412 (e.g. index results corresponding to "URL_E" in block 434 of public database 432 may be pre-empted by corresponding index entry "URL_E" in block 414b of private index 412). "URL_E" with a "null" weighting is shown in boldface in block 460a.

Thus, as illustrated in the ordered list at 460a, a list of URLs from private index 412 matching "KW1" are ordered based on keyword weighting. A list of URLs from public index 432 matching "KW1" then follows, again in order of keyword weighting. In this illustrative example, URLs from private index 412 are presented in advance of URLs from public index 432. This reflects an institution wanting to give first present to index entries located in its own private index 432 (i.e. corresponding to index 212) ahead of index entries found in public index 434 (i.e. corresponding to index 212).

Given the ordering of URLs from private index 412 and public index 432 as described above, relevant fields from corresponding records may be presented to the end-user, in the same order. For example, the URL field 234*b* (FIG. 2D) and other relevant fields may be presented to the end-user. However, in this illustrative example, even though "URL_E" is in the ordered list, as "KW1" for "URL_E" has been given a "null" weighting, "URL_E" is not displayed to the end-user. Thus, an undesirable URL obtained from the public index 213 may be effectively excluded from the combined list of search results presented to the end-user. For example, a predetermined value for a quality of match calculated from summing the weight of keywords matching a search request may cause a corresponding record to be dealt with in a particular manner. For example, a null weighting for the summed weight of keywords may be used to indicate that the associated URL (URL_E in the present example) should be excluded from presentation to the end-user.

As will be appreciated, the preemption or discarding of an index entry from public index 434 is triggered by a common value in a key field in both the private index and the public index. In an embodiment, the key field is linked to a URL field 234*b* (FIG. 3B) via a linking mechanism typically found in a relational database, such as by the HASH_URL fields 232*e*/234*a* of each of table 240 and table 250, as shown in the present illustration (FIGS. 2C and 2D) The pre-emption or discarding is then triggered when the identical URL is retrieved from both public index 432 and private index 434. Of course, it will be appreciated that another suitable field may be used.

Figure 4B:
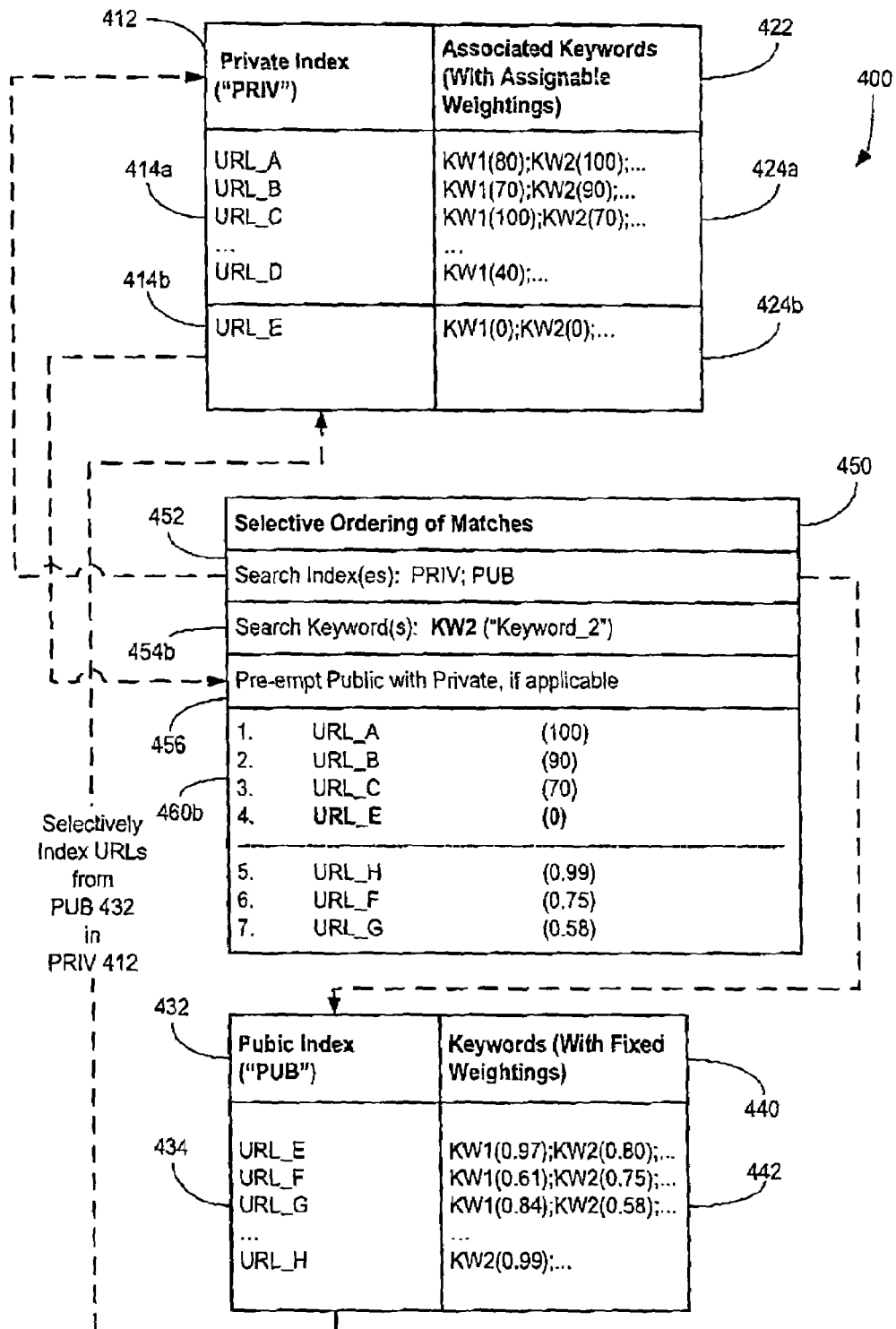
FIG. 4B schematically illustrates search results obtained for another example query.

FIG. 4B is a schematic block diagram of another illustrative example using an alternative query. The indexed URLs of private index 412 and index URLs of public index 432 are the same, but as shown at block 454*b*, the search keyword has been changed to "KW2". Thus, the combined list of ordered URLs are shown having a different constitution. For example, "URL_H" now appears in the list in block 460*b*. On the other hand, "URL_D" is not included, as it is only associated with "KW1" and not "KW2" Again, URLs from private index 412 are displayed in advance of URLs from public index 432.

In this example in FIG. 4B, "URL_E" of block 414*b* again preempts use of the index entry for "URL_E" of block 434. "URL_E" with its "null" weighting for "KW2" is shown in boldface in block 460*b*. Again, as "KW2" for "URL_E" has also been given a "null" weighting "URL_E" is not displayed to the end-user As will be appreciated, by associating any keyword or keywords with URLs in private index 412, and by assigning any selected weighting to the keywords in private index 412, substantially full control over presentation of these URLs in the combined search results 460*a*, 460*b* may be achieved. Advantageously, selected URLs from public index 432 over which full control is desired may be indexed in private index 412, such that keywords may be associated, and keyword weightings may be assigned by the administrator for an institution. This level of control may allow selective presentation of search results such that undesirable URLs from public index 432 are excluded.

Alternatively, if it is desired to promote a particular URL for more prominent display (e.g. "URL_E") from public index 432, the administrator can also assign a suitably high weighting to keywords associated with "URL_E" so that "URL_E" is prominently displayed in the combined search results.

As should now be appreciated, in order to allow institutions great flexibility, results obtained from private index 212/412 are used in place of results obtained from public index 213/432. Results from private index 212/412 are treated in priority over like results from public index 213/432. Embodiments of the invention could similarly include more than two indexes, each assigned a relative priority. In the event index entries sharing a like key field are retrieved in response to a search, results from the lower priority indexes are preempted by results from any higher priority index. Thus, only the matching result from the highest priority index would be included in any list of presented results. Advantageously, each index may be searched by a search algorithm (like algorithm 222 or 223) associated with only that index. As indexes are added, modular search algorithms may be added to search engine 214.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of operating a search engine for presenting search results in response to queries, said method comprising:
   (i) maintaining a first index comprising a plurality of index entries, each of said index entries comprising a key field and data from which a quality of match value of the index entry to a query can be determined using a known function;
   (ii) modifying selected index entries of said first index by an administrator so that the quality of match of the index entry to predefined queries provides a quality of match value selected by the administrator;
   (iii) receiving a query;
   (iv) querying said index entries of said first index using the received query to obtain a set of matching index entries from said first index, and forming a first set of search results from said set of matching index entries, each of said first set of search results comprising the key field of a matching index entry and the quality of match value for the index entry for the received query;
   (v) querying using the received query, index entries of a second index whose index entries cannot be modified by said administrator, to obtain a set of second search results each including a key field and a quality of match value for the received query to an entry in the second index;
   (vi) combining and ordering said first and second set of search results to generate a combined list of search results, in which any search result from said set of second search results for which its key field is identical to the key field of a search result in said first set of search results is discarded, in favor of said search result in said first set of search results, and in which said search results from said first and second set of search results are ordered in accordance with their respective associated quality of match values;
   so that selected search results from index entries of said first index are presented in a combined list in an order controlled by said administrator in response to defined queries.

2. The method of claim 1, wherein each of said index entries of said first index comprises at least one keyword, and said querying said index entries of said first index comprises matching keywords in the received query to said at least one keyword for each of said index entries of said first index.

3. The method of claim 2, wherein each of said at least one keyword is associated with a weight, and a quality of match value for each index entry of said first index is calculated by summing weights for each of said one keyword in the index entry that matches a keyword in the received query.

4. The method of claim 1, wherein said key field of each of said first set of search results identifies a uniform resource locator (URL), and said key field of each of said second set of search results identifies a URL.

5. The method of claim 4, wherein each of said index entries of said first index comprises at least one keyword, and said querying said index entries of said first index comprises matching keywords in the received query to said at least one keyword for each of said index entries of said first index.

6. The method of claim 5, wherein each of said at least one keyword is associated with a weight, and a quality of match value for each index entry of said first index is calculated by summing weights for each of said one keyword in the index entry that matches a keyword in the received query.

7. The method of claim 6, wherein said combining in vi comprises utilizing said quality of match value to present an ordered listing of URLs identified in each of said search results in said list of matching search results.

8. The method of claim 1, further comprising excluding search results having a predetermined quality of match from being presented as part of said ordered listing.

9. The method of claim 8, wherein said predetermined quality of match is a null value.

10. A computing device comprising a processor and computer readable memory, said memory storing:
   a first index modifiable by an administrator, said first index comprising a plurality of index entries each comprising a key field and data from which a quality of match value of the index entry to a query can be determined using a known function;
   a second index, comprising a plurality of index entries that are not modifiable by said administrator;
   software adapting said device to:
   allow said administrator to modify selected index entries of said first index so that the quality of match of the index entry to predefined queries provides a quality of match value selected by the administrator;
   (ii) receive a query;
   (iii) query said index entries of said first index using the received query to obtain a set of matching index entries from said first index, and form a first set of search results from said set of matching index entries, each of said first set of search results comprising the key field of a matching index entry and the quality of match value for the index entry for the received query;
   (iv) query using the received query, index entries of said second index to obtain a set of second search results each including a key field and a quality of match value for the received query to an entry in the second index;
   (v) combine and order said first and second set of search results to generate a combined list of search results, in which any search result from said set of second search results for which its key field is identical to the key field of a search result in said first set of search results is discarded, in favor of said search result in said first set of search results, and in which said search results from said first and second set of search results are ordered in accordance with their respective associated quality of match values;
   so that selected search results from index entries of said first index are presented in a combined list in an order controlled by said administrator in response to defined queries.

11. The device of claim 10, wherein each of said index entries of said first index comprises at least one keyword, and said software further adapts said device to query said index entries of said first index by matching keywords in the received query to said at least one keyword for each of said index entries of said first index.

12. The device of claim 11, wherein each of said at least one keyword is associated with a weight, and said search engine software further adapts said computing device to calculate a quality of match value for each index entry of said first index by summing weights for each of said one keyword in the index entry that matches a keyword in the received query.

13. The device of claim 10, wherein said key field of each of said first set of search results identifies a uniform resource locator (URL), and said key field of each of said second set of search results identifies a URL.

14. The device of claim 13, wherein each of said index entries of said first index comprises at least one keyword, and said software further adapts said device to query said index entries of said first index to match keywords in the received query to said at least one keyword for each of said index entries of said first index.

15. The device of claim 14, wherein each of said at least one keyword is associated with a weight, and said software adapts said computing device to calculate a quality of match value for each index entry of said first index is calculated by summing weights for each of said one keyword in the index entry that matches a keyword in the received query.

16. The device of claim 15, wherein said search engine software further adapts said computing device to combine said first and second set of search results from said each of said qualities of match to present an ordered listing of URLs identified in each of said search results in said list of matching search results.

17. The device of claim 16, wherein said search engine software further adapts said computing device to exclude search results having a predetermined quality of match from being presented as part of said ordered listing.

18. The device of claim 17, wherein said predetermined quality of match is a null value.

19. A computer readable medium, storing computer executable instructions that when loaded at a computing device comprising a processor and processor readable memory storing
   a first index modifiable by an administrator, said first index comprising a plurality of index entries each comprising a key field and data from which a quality of match value of the index entry to a query can be determined using a known function;
   a second index, comprising a plurality of index entries that are not modifiable by said administrator;
   said computer executable instructions adapting said device to:
   (i) allow said administrator to modify selected index entries of said first index so that the quality of match of the index entry to predefined queries provides a quality of match value selected by the administrator;
   (ii) receive a query;
   (iii) query said index entries of said first index using the received query to obtain a set of matching index entries from said first index, and form a first set of search results from said set of matching index entries, each of said first set of search results comprising the key field of a matching index entry and the quality of match value for the index entry for the received query;

(iv) query using the received query, index entries of said second index to obtain a set of second search results each including a key field and a quality of match value for the received query to an entry in the second index;

(v) combine and order said first and second set of search results to generate a combined list of search results, in which any search result from said set of second search results for which its key field is identical to the key field of a search result in said first set of search results is discarded, in favor of said search result in said first set of search results, and in which said search results from said first and second set of search results are ordered in accordance with their respective associated quality of match values;

so that selected search results from index entries of said first index are presented in a combined list in an order controlled by said administrator in response to defined queries.

20. The computer readable medium of claim 19, wherein each of said index entries of said first index comprises at least one keyword, and said computer executable instructions further adapt said computing device to query said index entries of said first index comprises matching keywords in the received query to said at least one keyword for each of said index entries of said first index.

21. The computer readable medium of claim 20, wherein each of said at least one keyword is associated with a weight, and said computer executable instructions further adapt said computing device to calculate a quality of match value for each index entry of said first index by summing weights for each of said one keyword in the index entry that matches a keyword in the received query.

22. The computer readable medium of claim 19, wherein said key field of each of said first set of search results identifies a uniform resource locator (URL), and said key field of each of said second set of search results identifies a URL.

23. The computer readable medium of claim 22, wherein each of said index entries of said first index comprises at least one keyword, and said computer executable instructions further adapt said computing device to query said index entries of said first index and match keywords in the received query to said at least one keyword for each of said index entries of said first index.

24. The computer readable medium of claim 23, wherein each of said at least one keyword is associated with a weight, and said computer executable instructions further adapt said computing device to calculate a quality of match value for each index entry of said first index by summing weights for each of said one keyword in the index entry that matches a keyword in the received query.

25. The computer readable medium of claim 24, wherein said computer executable instructions further adapt said computing device to utilize said quality of match value to present an ordered listing of URLs identified in each of said search results in said list of matching search results.

26. The computer readable medium of claim 19, wherein said computer executable instructions further adapt said computing device to exclude search results having a predetermined quality of match from presentation to said end-user.

27. The computer readable medium of claim 26, wherein said predetermined quality of match is a null value.

* * * * *